(12) United States Patent
Duffin

(10) Patent No.: US 6,392,191 B1
(45) Date of Patent: May 21, 2002

(54) LASER BREAKTHROUGH DETECTION

(75) Inventor: Jason E. Duffin, Leicestershire (GB)

(73) Assignee: M. J. Technologies Limited, Leicestershire (GB)

( * ) Notice: Subject to any disclaimer, the term of this patent is extended or adjusted under 35 U.S.C. 154(b) by 0 days.

(21) Appl. No.: 09/294,634

(22) Filed: Apr. 19, 1999

(51) Int. Cl.$^7$ ............................................. B23K 26/02
(52) U.S. Cl. ........................... 219/121.62; 219/121.7; 219/121.71; 219/121.83; 219/121.81
(58) Field of Search .................. 219/121.61, 121.62, 219/121.67, 121.7, 121.71, 121.72, 121.83, 121.81

(56) References Cited

U.S. PATENT DOCUMENTS

| | | | |
|---|---|---|---|
| 4,873,414 A | * 10/1989 | Ma et al. | 219/121.7 |
| 4,960,970 A | * 10/1990 | Schneiter | 219/121.83 X |
| 5,026,964 A |   6/1991 | Somers et al. | 219/121.7 |
| 5,045,669 A | *  9/1991 | Ortiz, Jr. et al. | 219/121.83 |
| 5,049,723 A | *  9/1991 | Macdonald | 219/121.83 |
| 5,155,328 A | * 10/1992 | Ikawa | 219/121.83 |
| 5,463,202 A | * 10/1995 | Kurosawa et al. | 219/121.83 |
| 5,698,120 A | * 12/1997 | Kurosawa et al. | 219/121.62 |

FOREIGN PATENT DOCUMENTS

| | | | |
|---|---|---|---|
| EP | 0 344 339 | 6/1989 | |
| GB | 2 113 592 | 10/1983 | |
| GB | 2318538 | *  4/1998 | ............ 219/121.71 |
| JP | 61-3695 | *  1/1986 | .............. 219/121.7 |
| JP | 6-277862 | * 10/1994 | .............. 219/121.7 |

* cited by examiner

*Primary Examiner*—Gregory Mills
(74) *Attorney, Agent, or Firm*—Buchanan Ingersoll, P.C.

(57) ABSTRACT

A method and apparatus are provided for the reliable detection of breakthrough of a pulsed laser beam used to drill through a substrate. The apparatus comprises one or more optical sensors positioned out of line of the axis of the laser beam, but positioned to monitor light emitted from the cutting zone. The method comprises means for identifying minute but significant changes in the rate of decay of the trailing edge of each pulse of emitted light as breakthrough occurs. Significant amplification of the emitted light signals may be necessary before these changes can be identified, but the discernible characteristic change that triggers breakthrough detection according to the invention is a rapid increase in the rate of decay of the emitted light signal on the instant of breakthrough.

7 Claims, 2 Drawing Sheets

LASER BREAKTHROUGH DETECTION

BACKGROUND OF THE INVENTION

1. Field of the Invention

The invention relates to the general field of breakthrough detection in the use of pulsed lasers as drilling, boring or cutting tools. In such laser machining an accurately focused laser beam is directed against a workpiece so as to vaporize a portion of that workpiece. It is desirable for the apparatus to be able to sense when the laser beam has cut completely through the workpiece and established breakthrough on the other side, since continued application of the laser beam to the same spot on the workpiece will result in damage to the surface below, which surface might be a support for the workpiece or another part or ply or lamination of the workpiece immediately beneath that which is being machined.

2. Description of the Related Art

It is not always necessary to be able to detect breakthrough. For some applications it is possible to place immediately beneath the workpiece or immediately beneath that portion of the workpiece which is being cut a plate or sheet or layer of a material such as polytetrafluorethylene for use as a barrier to the laser beam after breakthrough. The material chosen should be one that does not drill efficiently using a laser. Some waxes have this property, and it has been proposed that complicated shapes of workpiece can be immersed in such a wax before drilling, so that after breakthrough surfaces beyond the drilled hole but still in line with the laser beam are not unintentionally damaged. This solution to the problem is, however, unsatisfactory in that the application of the barrier layer, and then its removal after drilling, are additional steps in the manufacturing process and in any case without an accurate knowledge of the precise time of breakthrough in every case, the system must be designed to overdrill each hole in the workpiece, which can add significantly to the time taken to machine a complicated workpiece such as an aircraft turbine blade which might have as many as 4000 holes drilled in one or more of its surfaces.

British Patent No. GB-B-2113592 proposes a real time system for monitoring breakthrough, which involves placing an optical camera along the optical axis of the laser beam as it attacks the surface of the workpiece, and monitoring the reflected light which is reflected from the workpiece axially back along the path of the laser cutting beam. The theory is that when breakthrough occurs, so that light is no longer reflected from the bottom of the hole being drilled, the amount of reflected light strictly on the axis of the laser beam will dramatically fall. This theory may be sound for the operation of drilling through a single skin workpiece, but for more complicated workpiece shapes such as aircraft turbine blades with internal cavities, the theory breaks down because light can be reflected not from the bottom of the hole being drilled but from the next skin of the workpiece as viewed through the drilled hole. Careful monitoring of the pulses of light reflected from aircraft turbine blades at the moment of breakthrough in accordance with GB-B-2113592 has failed to identify any consistently reproducible change in the characteristic of the reflected light pulse.

BRIEF SUMMARY OF THE INVENTION

The applicants were reluctant to accept that there could be no discernible or detectable change at the moment of breakthrough, and they therefore embarked on a research programme outside of the teaching of GB-B-2113592, to try to locate and identify such a discernible change. The sensing camera was moved away from the logical position of axial alignment as taught in GB-B-2113592, and during and after each laser pulse the emitted (reflected and radiated) light was carefully analysed until a consistent and reliable discernible change was identified. Surprisingly, the change was found to be a change not in the intensity but in the rate of decay of each pulse of light emitted from the workpiece at angles well displaced from the axial centre line of the laser beam. That change was only discernible after substantial amplification of the signals representing the emitted pulse of light, and could still clearly be identified even when the amplification was such as to saturate the amplified signal for all but the extreme trailing edge of that emitted pulse. It should be appreciated that it is not the intensity of the axially reflected beam that is monitored, as in GB-B-2113592, but the rate of decay of the trailing edge portion only of each emitted pulse.

The invention accordingly provides a method for the detection of breakthrough of a pulsed laser beam used to drill through a substrate, which method comprises positioning an optical sensor out of the line of the axis of the laser beam but in a position to monitor light emitted from the cutting zone, and means for identifying minute but significant changes in the rate of decay of the trailing edge of each pulse of emitted light as breakthrough occurs.

The discernible changes in the rate of decay are so slight that they are currently incapable of recognition without amplification of the emitted light signal. An amplification factor of about 20× has been found to be appropriate, and it is immaterial that such an amplification factor produces saturation of the amplifier for all but the critical tail portion of the emitted light signal being monitored. Although the change in the rate of decay is extremely small it is, nevertheless, highly reproducible and characteristic of the instant of breakthrough, and the same phenomenon has reliably been observed for a wide range of power ratings of pulsed YAG lasers and for a wide range of workpieces.

The optical sensor may monitor any convenient wavelength of emitted light. Ultraviolet sensors are readily available and have been found to be extremely satisfactory. Modern high performance silicon photodetectors are capable of enhanced broadband spectral responsivity in the 190 to 400 nm range, where high shunt resistance and maximum sensitivity are essential. The devices operate with a high speed rise time of about 0.4 microseconds.

If the photodiode is arranged to operate in a photoamperic mode, i.e. connected to a low value of load resistance, then the effect on dynamic resistance is negligible and the output current is linearly related to light level. This may then be fed to a current to voltage converter circuit and amplified. Filtering of the resulting amplified signal enables the relevant change in the rate of decay of the trailing edge of the amplified pulses to be accurately identified, resulting in a completely valid breakthrough detection system. Moreover the system is able to focus the optical sensor on the region of interest without any movement of the optical sensors relative to the beam and nozzle structure.

The invention also provides an apparatus for detecting breakthrough in a laser drilling apparatus, comprising an optical sensor arranged out of line of the axis of the laser beam to detect light emitted from the cutting zone beneath a nozzle of the laser, optionally an amplifier to amplify the intensity of the output signal from the optical sensor, and means for monitoring and optionally displaying the rate of decay of the tail portion of each pulse of emitted light, to detect variations that would indicate that breakthrough had occurred.

The actual change in the characteristic of the trailing edge of the pulse of emitted light which is significant is a rapid steepening of that trailing edge at the instant of breakthrough. Preferably the apparatus can be provided with two or three or more optical sensors arranged around the laser cutting head and focused on the cutting zone from different aspects. The apparatus then preferably includes manual or automatic means for selecting, from the different outputs of the optical sensors, that which gives the most appropriate and discernible change in the rate of decay of the detected pulse on breakthrough.

The apparatus preferably further comprises means for automatically discontinuing the pulsing of the laser beam on breakthrough, and optionally means for automatically indexing the laser head on to a second cutting location at another part of the workpiece to drill a new hole immediately on detection of breakthrough at the first cutting location.

DETAILED DESCRIPTION OF THE INVENTION

Figure 1:
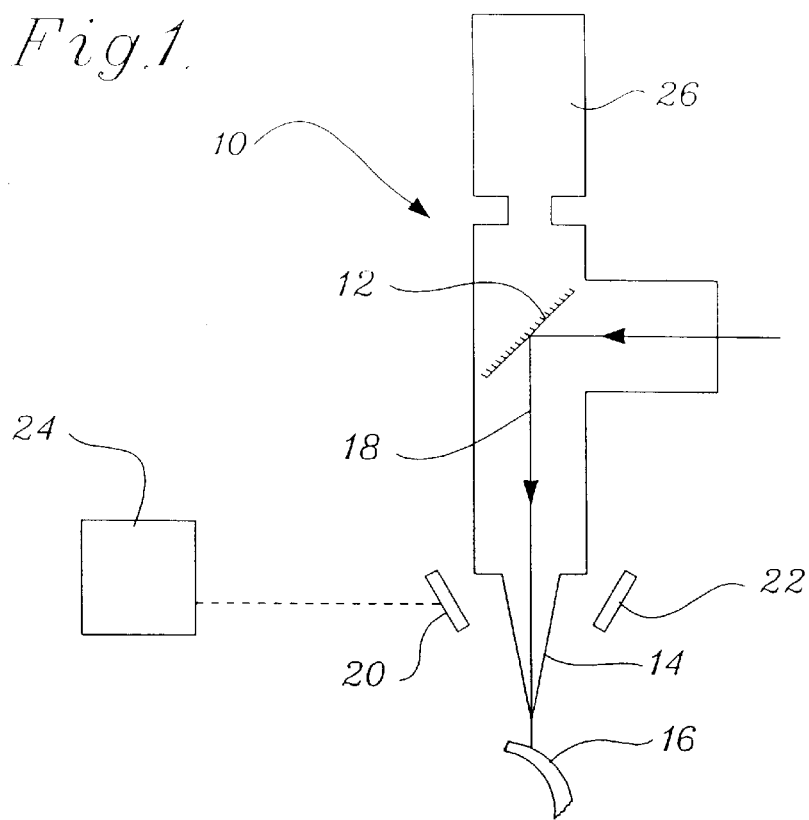
FIG. 1 illustrates schematically the use of a Nd:YAG pulse laser to drill holes in a workpiece such as an aircraft turbine blade tip.

FIG. 1 illustrates generally a laser machining workstation for drilling or boring holes in a workpiece. An Nd-YAG laser 10 incorporates a YAG mirror 12 for reflecting a laser beam 13 through a nozzle 14 onto a workpiece 16. Focussing means (not shown) are provided for transmitted to the workpiece a precisely focussed narrow beam of laser energy along an axis 18.

In FIG. 1 the workpiece is illustrated as being a turbine tip blade for an aircraft jet engine. Such a workpiece comprises a top plate portion and a bottom plate portion separated by an air chamber. The laser beam is shown in FIG. 1 as being directed against the top plate portion. If the laser were switched on in this arrangement, the pulsed beam would first cut through the top plate portion and if cutting were continued would then pass through the air chamber to cut or to start to cut into the bottom plate portion. To prevent damage to the bottom plate portion of the turbine blade it is necessary to detect the instant of breakthrough, and to achieve that the invention provides one or more optical sensors 20, 22 positioned out of alignment with the laser beam axis 18 and directed towards the zone of interaction between the laser beam and the workpiece.

In FIG. 1 two optical sensors 20, 22 are shown, but it will be understood that both work in an identical manner and in practice the best signal from the available sensors will be sent to a signal processor for processing.

The optical sensors 20, 22 are positioned outside the outer envelope of the nozzle 14, and therefore well out of alignment with the axis 18. This is in contrast with the optical sensing along the axis as taught in GB-A-2113592 which observes the radiation reflected back along the axis 18 and straight through the mirror 12 (i.e. without reflection at the mirror) to an in-line camera 26.

The output of the optical sensor 20 that has been selected to give the best output signal is a current representing the amplitude of the light emitted from the workpiece at the zone of interaction between the laser beam and the workpiece. The signal processor 24 converts that current signal into a voltage signal and then amplifies the voltage signal with an amplification factor sufficient to facilitate the necessary analysis of the decay rate of the trailing edge of each emitted pulse.

Figure 2:
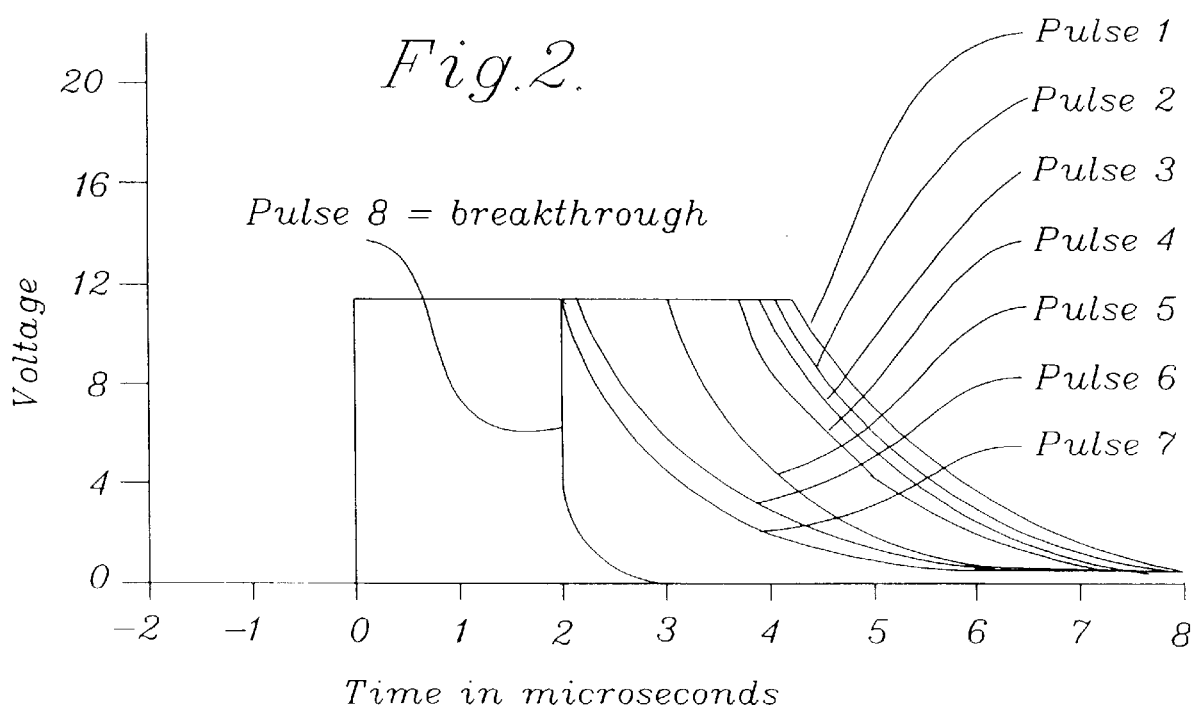
FIGS. 2 to 4 are graphs showing the change in the monitored rate of decay of the trailing edge of the emitted pulse for different laser powers and different workpieces.

FIG. 2 illustrates the output of the processor 24 which monitors the pulse-drilling of a narrow hole through a guide vane of an aircraft engine turbine, with the Nd-YAG laser operating at 6 Joules. Eight pulses of radiation are needed to drill completely through the guide vane, with the laser pulse firing for the first 1.8 microseconds of each wave form. The first two pulses show quite clearly the laser pulse causing light saturation in the uv spectrum, with a falling "tail" after 4 microseconds as the emitted light from the laser/workpiece interaction zone dies away. After four pulses, the keyhole created causes a sudden increase in the absorbptivity due to multiple reflections, and the hole deepens quickly. The trace gives evidence of the beam starting to couple into the material as the falling edge starts to move closer to the laser pulse width of 1.8 milliseconds. Pulses 5, 6 and 7 show the reflected light being reduced even more as the material is penetrated, with the falling edge becoming gradually steeper until breakthrough occurs at pulse 8. Beyond this point, the wave form remains with the falling edge at a maximum gradient. The processor 24 permits the high speed recognition of the breakthrough pulse by a combination of local maxima and the gradient of the voltage/time curve.

Figure 3:
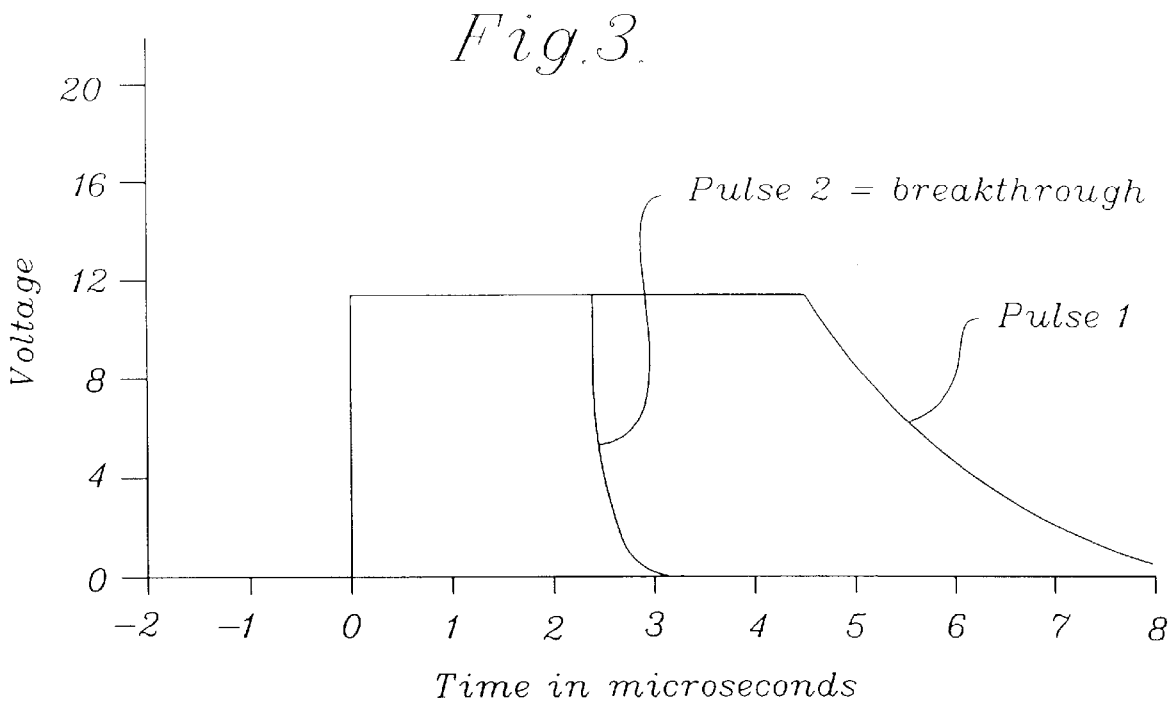

FIG. 3 is a similar graph showing the output of the processor 24, for the pulse drilling of a stage 1 engine turbine blade for an aircraft jet engine, using an Nd-YAG laser operating at a pulse energy of 6.5 Joules. On this occasion breakthrough occurred at the second pulse, and FIG. 2 demonstrates the general application of the breakthrough detection system. Even though the workpiece is a blade of a different thickness, shape and orientation, the same characteristic of a rapidly increasing slope of the falling edge of the emitted light pulse can readily be determined from FIG. 3.

Figure 4:
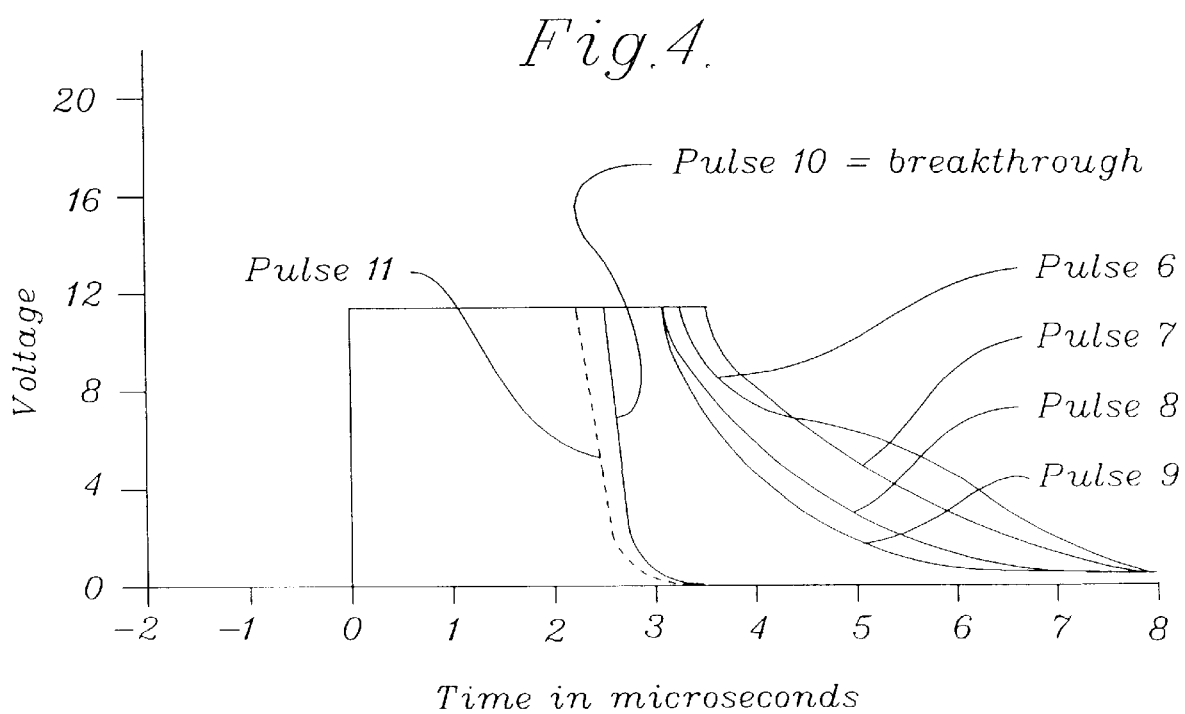

FIG. 4 illustrates the output of the signal processor 24 for the drilling of a stage 1 inlet guide vane of a power station turbine. That is a much larger scale component than the relatively small sized aircraft components of FIGS. 2 and 3, and illustrates that the breakthrough detection system of the invention is operationally limited by the size of the components being drilled. The drilling of FIG. 4 was carried out on a curved surface of the inlet guide vane, at an angle of about 25° to the normal. Breakthrough occurred on the tenth laser pulse, establishing the same characteristically acute change in the rate of decay of the emitted light from the workpiece at the end of that pulse. FIG. 4 also shows, in broken line, the output signal that is obtained on an eleventh pulse, which is one that would travel completely through the drilled hole, to span an air gap and attack a further surface of the workpiece.

It has been found that the sharp increase to a maximum gradient of the decaying emitted light signal, which permits the identification of breakthrough according to the invention, always occurs at a certain percentage time after the termination of the laser pulse. For example, in FIG. 2 the laser pulse duration is 1.8 microseconds but the steep decay in the emitted energy from the laser/workpiece interaction zone occurs approximately 2 microseconds from the initiation of the laser pulse. In FIG. 3 with the same pulse duration the high gradient indicating breakthrough is established at about 2.6 microseconds from initiation of the laser pulse. The short delay between the termination of the laser pulse and the maximum gradient in the output signal, indicating breakthrough, is related to the laser pulse energy at which drilling is carried out. Therefore regardless of the size, shape and orientation of the workpiece being drilled, the signal processor can always analyse the establishment or otherwise of the high gradient decay signal at a precise window of time, which can be predictably based on the laser pulse energy.

Results similar to those illustrated in FIGS. 2 to 4 have been obtained when drilling testpieces of steel plate of 2, 3 and 4 mm, as well as with the test drilling of a wide range of aircraft components. Those tests show that the breakthrough detection system is highly repeatable, and the results so consistent that it is possible to use the output of the signal processor 24 to control the laser, to prevent the firing of further energy pulses at the same target after breakthrough has been detected, and if desired to utilize the breakthrough detection to initiate the automatic indexing of the laser to the next desired cutting location on the workpiece.

I claim:

1. A method for the detection of breakthrough of a pulsed laser beam used to drill through a substrate, using an optical sensor to monitor light emitted from a cutting zone, characterized in that the optical sensor is positioned out of a line of axis of the laser beam, and in that a signal output of the optical sensor is processed and analysed to identify an increase in the rate of decay of a trailing edge of each pulse of emitted light as breakthrough occurs.

2. A method according to claim 1, wherein the processing of the output of the optical sensor includes the step of amplifying that output signal.

3. A method according to claim 2, wherein the amplification is at an amplification factor of about 20×.

4. An apparatus for detecting breakthrough in a laser drilling machine, comprising an optical sensor arranged out of line of an axis of a laser beam to detect light emitted from a cutting zone beneath a nozzle of the laser drilling machine, and means for monitoring the rate of decay of a tail portion of each pulse of emitted light, to detect a sharp increase in the rate of decay which indicates that breakthrough has occurred.

5. An apparatus according to claim 4 wherein a plurality of optical sensors are arranged around a laser cutting head and focused onto the cutting zone from different aspects; wherein the apparatus further includes manual or automatic means for selecting, from the different outputs of the optical sensors, that which gives the most appropriate and discernible change in the rate of decay of the detected pulse on breakthrough.

6. An apparatus according to claim 4, further comprising means for automatically discontinuing the pulsing of the laser beam on detection of breakthrough.

7. An apparatus according to claim 6, further comprising means for automatically indexing a laser head on to a second cutting location at another part of the workpiece to drill a new hole immediately on detection of breakthrough at the first cutting location.

* * * * *